(12) United States Patent
Ries et al.

(10) Patent No.: US 11,691,096 B2
(45) Date of Patent: *Jul. 4, 2023

(54) FILTER PULSATION DAMPENING DEVICE

(71) Applicant: Caterpillar Inc., Peoria, IL (US)

(72) Inventors: Jeffrey R. Ries, Metamora, IL (US);
Jon T. Immel, Chillicothe, IL (US);
Javier A. Rodriguez, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/495,099

(22) Filed: Oct. 6, 2021

(65) Prior Publication Data

US 2022/0023781 A1 Jan. 27, 2022

Related U.S. Application Data

(63) Continuation of application No. 16/682,378, filed on Nov. 13, 2019, now Pat. No. 11,207,619.

(51) Int. Cl.
*B01D 35/15* (2006.01)
*B01D 35/157* (2006.01)
*B01D 27/08* (2006.01)

(52) U.S. Cl.
CPC ........... *B01D 35/157* (2013.01); *B01D 27/08* (2013.01)

(58) Field of Classification Search
CPC ................. B01D 35/157; B01D 27/08; B01D 2201/0415; B01D 2201/291; B01D 29/925; B01D 35/1475; B01D 35/153; B01D 29/21
See application file for complete search history.

(56) References Cited

U.S. PATENT DOCUMENTS

| | | | |
|---|---|---|---|
| 3,442,384 A | 5/1969 | Downey et al. | |
| 4,428,834 A | 1/1984 | McBroom et al. | |
| 6,247,486 B1 | 6/2001 | Schwegler et al. | |
| 6,648,557 B1 | 11/2003 | Morrow et al. | |
| 8,211,302 B2 | 7/2012 | Mount et al. | |
| 8,479,712 B2 | 7/2013 | Nakane | |
| 2009/0145825 A1 | 6/2009 | Kolczyk et al. | |
| 2012/0024771 A1 | 2/2012 | Abdalla et al. | |
| 2012/0248024 A1 | 10/2012 | Wells et al. | |

FOREIGN PATENT DOCUMENTS

| | | | | |
|---|---|---|---|---|
| CN | 107061084 A | 8/2017 | | |
| CN | 108479188 | 9/2018 | | |
| CN | 208234589 | 12/2018 | | |
| DE | 2905918 A1 | 8/1980 | | |
| GB | 2308986 B | 6/1999 | | |
| JP | 02223664 A | * 9/1990 | ........... F02M 69/462 |
| WO | 2013053482 A1 | 4/2013 | | |

* cited by examiner

Primary Examiner — Waqaas Ali

(57) ABSTRACT

A filter pulsation dampening device has a replaceable filter element including a plurality of baffles disposed next to each other or a flexible valve that is disposed proximate a baffle.

20 Claims, 4 Drawing Sheets

FILTER PULSATION DAMPENING DEVICE

CROSS-REFERENCE TO RELATED APPLICATION(S)

This is a continuation application claiming benefit of application Ser. No. 16/682,378, filed on Nov. 13, 2019, having the same title, and the content of which is hereby incorporated herein by reference in its entirety.

TECHNICAL FIELD

The present disclosure relates generally to canister style filter systems that employ a replaceable filter element. More specifically, the present disclosure relates to a filter element that includes a positioning and sealing feature for positioning the filter element axially and radially in a desired position while providing a seal that helps to ensure that dirty fluid is filtered by the filtering medium of the filter element.

BACKGROUND

Liquid filter systems are known for filter various fluids such as gas, oil, diesel fuel, etc. to remove contaminants from these fluids. In some cases, the filter is in fluid communication with pumps, engines, or other similar devices that may create pulses in the fluid to be filtered that may reach the filter. It has been shown that pressure pulses can reduce the efficiency of filters in actual use depending on the environment in which the filters operate.

U.S. Pat. No. 8,479,712 discloses a pulsation reducing apparatus that includes a piston that is displaced in a valve chamber due to an increase in a fuel pressure in an upstream fuel passage caused by a pressure pulse. The fluid communication between the valve chamber and a downstream fuel passage is blocked, and fluid communication between the valve chamber and a return passage is unblocked, allowing a bypass flow of fluid. The pressure pulse is thus conducted into the return passage and dampened by a pulsation reducing mechanism including a plurality of flow restricting orifices. The fuel, once it has passed through the orifices, is returned to the upstream fuel passage through the return passage.

As can be seen, the '712 patent requires an extra mechanism outside of the filter to provide pressure pulse protection. This extra mechanism increases the overall cost of the system and may need maintenance itself.

Accordingly, it desirable to develop a pressure pulse protection mechanism that is less complicated, less costly, and easier to maintain.

SUMMARY OF THE DISCLOSURE

A replaceable filter element that includes at least a partially cylindrical configuration and that defines a longitudinal axis, and a radial direction according to an embodiment of the present disclosure is provided. The filter element may comprise an annular filter media defining a central passage, a center tube that is disposed in the central passage of the annular filter media that defines a central reservoir, and the annular filter media surrounds the center tube and the central reservoir, a top open end joined to the center tube disposed along the longitudinal axis, the top open end including an opening allowing fluid to flow from the central reservoir to the outside of the filter element, and a bottom open end joined to the center tube opposite the top open end disposed along the longitudinal axis. A filter pulsation dampening device may be provided that includes a filter element baffle extending longitudinally upwardly from the top open end or from the center tube of the filter element.

A housing bolt for use with a filter element for providing a filter pulse dampening device according to an embodiment of the present disclosure is provided. The housing bolt may comprise an at least partially cylindrical body defining a cylindrical axis and a radial direction, and may include a head defining a head diameter, a shaft portion extending axially from the head, the shaft portion defining a shaft portion diameter that is less than the head diameter, forming a support surface configured to contact a portion of the filter element, and a first baffle extending from the shaft portion, the first baffle extending axially away from the head and radially away from the shaft portion.

A pulse dampening interface between a filter and a filter base that is configured to mitigate pulses according to an embodiment of the present disclosure is provided. The interface may comprise a filter element that includes at least partially a cylindrical configuration and that defines a longitudinal axis, and a radial direction. The filter element may further comprise an annular filter media defining a central passage, a center tube that is disposed in the central passage of the annular filter media that defines a central reservoir, and the annular filter media surrounds the center tube and the central reservoir, a top open end joined to the center tube disposed along the longitudinal axis, the top open end including an opening allowing fluid to flow from the central reservoir to the outside of the filter element, and a bottom open end joined to the center tube opposite the top open end disposed along the longitudinal axis. A housing bolt and a base that interfaces with the filter element may also be provided. A filter pulsation dampening device that is operatively associated with the base and the filter element may include a first baffle extending from the housing bolt, and a second baffle extending either from the base or the filter element that is disposed proximate to the first baffle, defining a flow passage with a minimum distance between the first baffle and the second baffle.

DETAILED DESCRIPTION

Figure 1:
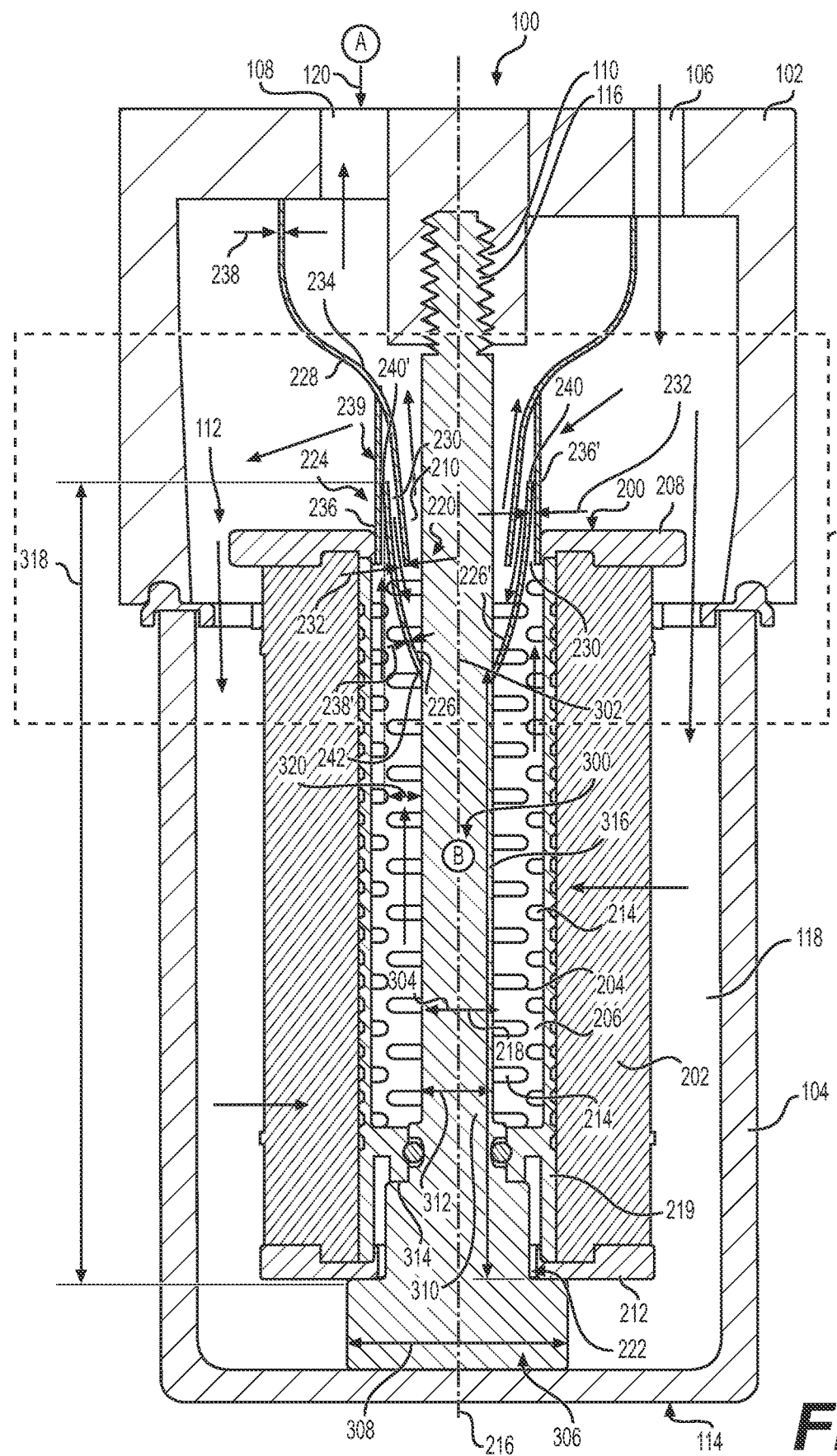
FIG. 1 is a front sectional view of a filter assembly of showing a filtration pulsation dampening device using small passages and baffles to keep pressure pulses from getting to the filter element according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100"

etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

First, a filter system will now be described to give the reader the proper context for understanding how various embodiments of the present disclosure are used. It is to be understood that this description is given as exemplary and not in any limiting sense. Any embodiment of an apparatus or method described herein may be used in conjunction with any filter system.

Then, a filter element that may include a pulsation dampening device according to various embodiments will be discussed. The device may include an assortment of baffles, baffles and/or valves, etc. that are attached to various components of the filter element, the center tube, the top end cap, the base, etc.

FIGS. 1 thru 4 illustrate a canister filter system 100, 100' that may use a filter element 200, 200' according to various embodiments of the present disclosure. This system may also be referred to as a pulse dampening interface between a filter and a filter base that is configured to mitigate pulses.

Figure 3:
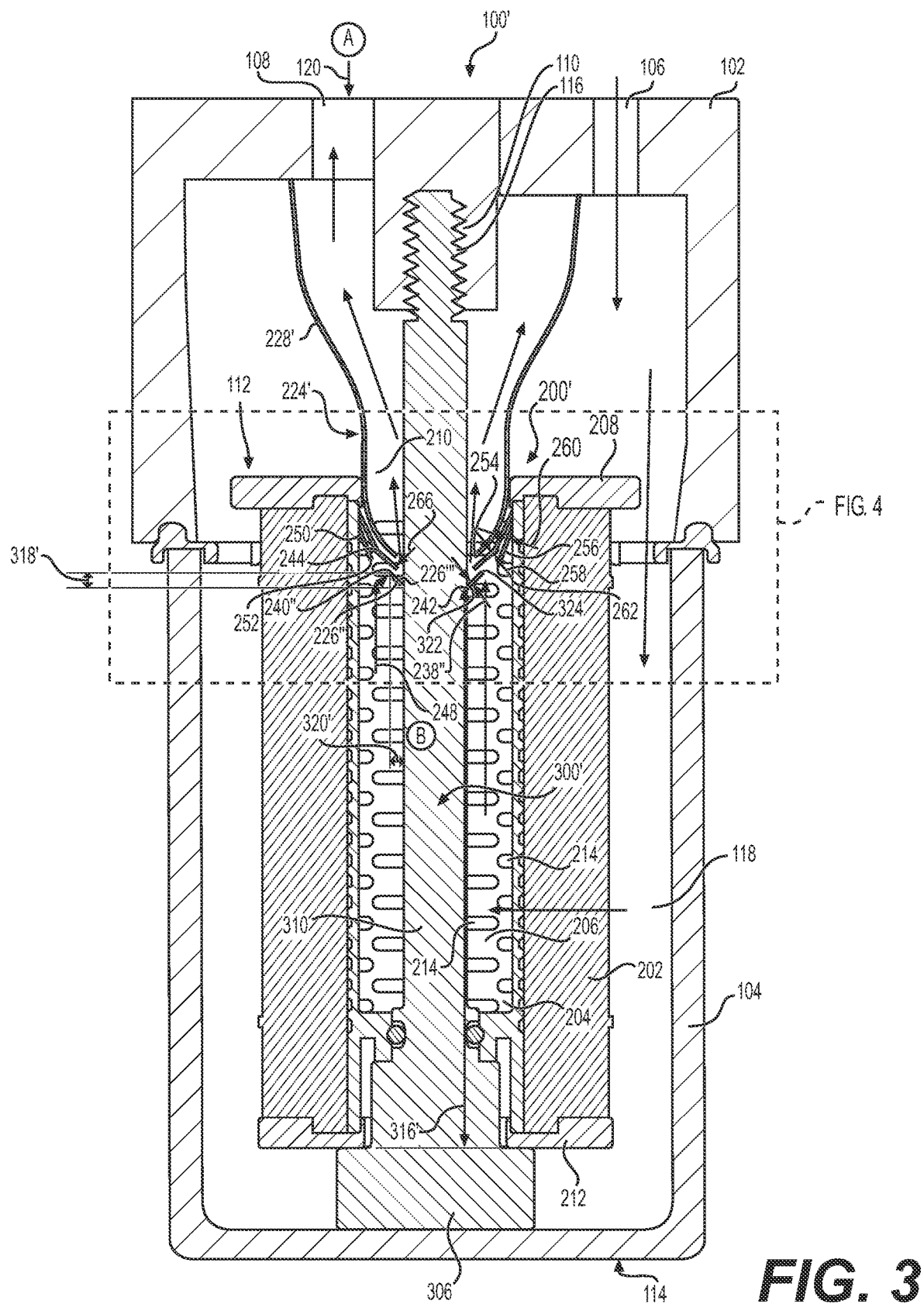
FIG. 3 is a front sectional view of a filter assembly of showing a filtration pulsation dampening device using a rubber valve to keep pressure pulses from getting to the filter element according to another embodiment of the present disclosure.

Starting with FIGS. 1 and 3, the canister filter system 100, 100' may include having a base 102, a canister 104, and a filter element 200, 200'. The canister filter system 100 may be used to filter fluids such as diesel or gasoline or other liquid fuels, lubrication oil, hydraulic fluid for hydraulic power systems, transmission fluid, or even possibly intake air for an engine. The canister filter system 100 may also be used as a fuel/water separator filter. The canister filter system 100 with the features described herein could be adapted by those of ordinary skill in this art to serve many different purposes and suit many other applications.

The base 102 includes an inlet channel 106 for fluid to enter into the canister filter system 100, and an outlet channel 108 for fluid to exit from the canister filter system 100. The base 102 also includes base threads 110. Other attachment structure than threads may be used.

The canister 104 includes a top open end 112 and a bottom closed end 114. Adjacent the top open end 112 are bolt threads 116 which can be engaged with base threads 110 to hold the canister 104 to base 102. Threads are one example of engagement structures which may be included on the base 102 and bolt 300, 300' to form a releasable engagement. Other engagement structures may be used as will be recognized by those of ordinary skill in this art.

The filter element 200, 200' may take many different forms to suit a particular application. In the illustrated embodiment, the filter element 200, 200' is well suited for filtering fuel or lubrication oil. The filter element 200, 200' may include annular filter media 202 circumferentially surrounding a central reservoir 204 defined by a center tube 206. Axial ends of annular filter media 202 are shown to be sealed by end caps.

A top end cap 208 may define an axial open end of filter element 200. The top end cap 208 is termed "open" because it includes an opening 210 for allowing passage of fluid to outlet channel 108 from the central reservoir 204 defined by center tube 206.

On the other hand, the bottom end cap 212 defines an axial closed end of filter element 200. The bottom end cap 212 is termed "closed" because it prevents any fluid outside the filter element 200 adjacent the axial end of the annular filter media 202 from flowing unfiltered into center tube 206. The bottom end cap 212 may be closed by mating with a housing bolt 300, 300' that in turn mates with the center tube 206. This may not be the case for other embodiments of the present disclosure.

The top end cap 208 and the bottom end cap 212 may each be joined to the center tube 206 via welding, adhesives, etc. Alternatively, several or all of center tube 206, the top end cap 208, and the bottom end cap 212 may be constructed as unitary components. Other configurations are possible.

In operation, fluid to be filtered enters from the inlet channel 106 and flows to the annular cavity 118 between canister 104 and the annular filter media 202. The fluid then passes into and through filter media 202, then into the center tube 206 through the perforations 214 shown therein in FIGS. 1 and 2.

Then, the fluid exits center tube 206 through the top end cap 208 and opening 210 into the outlet channel 108. The sealed construction at the bottom of the filter element 200, 200' helps to define the fluid channels into and out of the annular filter media 202, preventing any fluid from flowing directly to outlet channel 108 and bypassing the annular filter media 202. To the same end, baffles, baffles and valves, etc. may be provided at the top of the canister filter system 100, 100' that will be discussed in detail later herein that prevent provide a similar seal and may also provide a pulsation dampening device according to various embodiments of the present disclosure.

Figure 2:
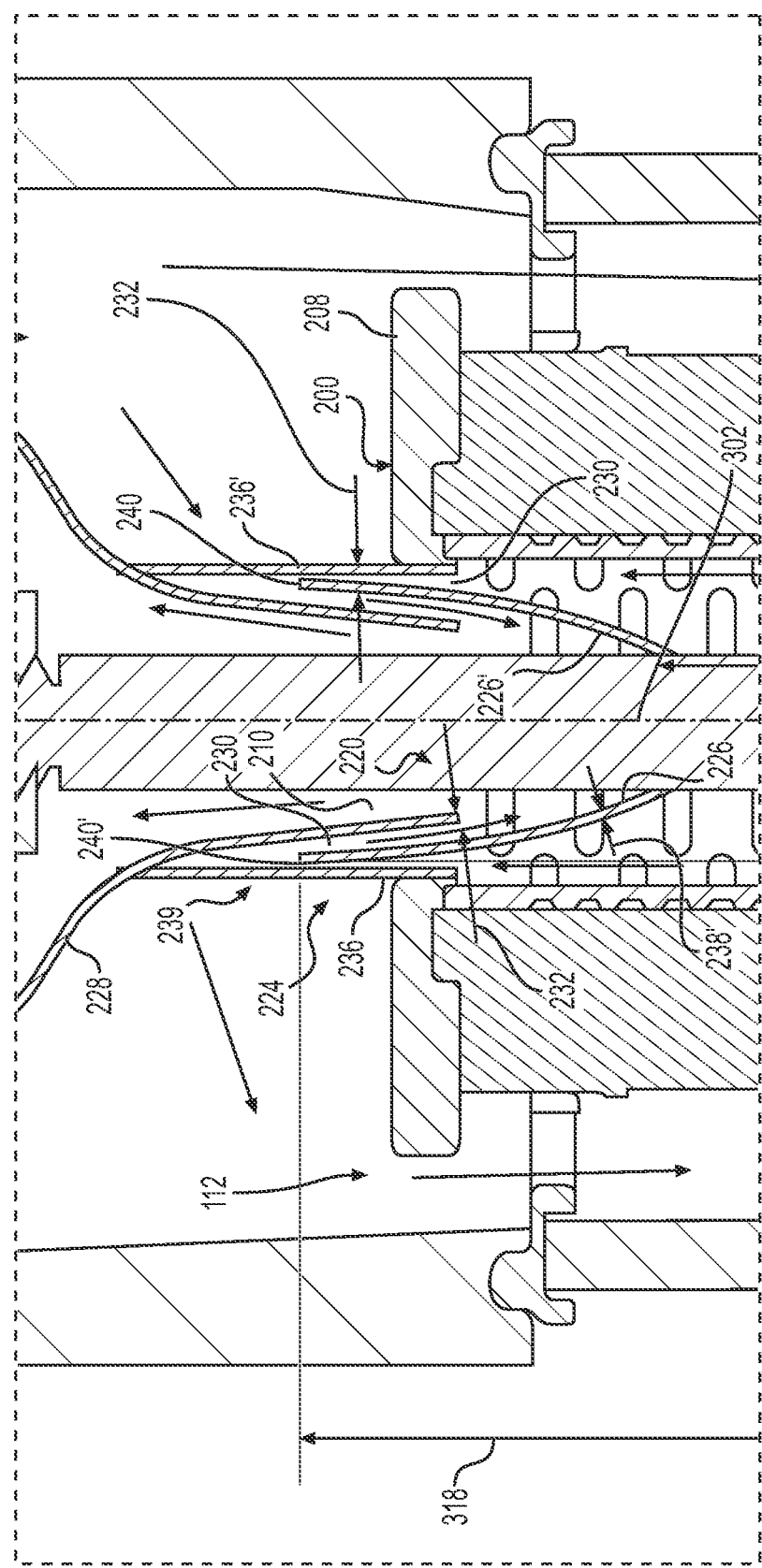
FIG. 2 is an enlarged detail view of the filtration pulsation dampening device of the filter assembly FIG. 1.

Referring now to FIGS. 1 and 2, a canister filter system 100 according to various embodiments of the present disclosure that provides a pulsation dampening device will now be discussed.

The canister filter system 100 may comprise a filter element 200 that includes at least partially a cylindrical configuration and that defines a longitudinal axis 216, and a radial direction 218. The filter element 200 may comprise an annular filter media 202 defining a central passage 219 and a center tube 206 that is disposed in the central passage 219 of the annular filter media 220 that defines a central reservoir 204. Thus, the annular filter media 202 surrounds the center tube 206, and the central reservoir 204.

As best seen in FIG. 1, the filter element 200 may further include a top open end 220 joined to the center tube 206 disposed along the longitudinal axis 216. The top open end 220 includes an opening 210 that allows fluid to flow from the central reservoir 204 to the outside of the filter element 200.

Similarly, referring again to FIG. 1, the filter element 200 may include a bottom open end 222 joined to the center tube 206 opposite the top open end 220 that is also disposed along the longitudinal axis 216. Thus the bottom open end 222 allows insertion of the housing bolt 300.

The canister filter system 100 may also include a canister 104 that includes a top open end 112 (see FIG. 1), and a bottom closed end 114 relative to the longitudinal axis 216 (as previously described herein, see FIGS. 1 and 3), and a housing bolt 300 that may penetrates through the bottom closed end 114 of the canister 104 (providing a seal(s)) or side on top of the bottom closed end 114 as shown in FIGS. 1 and 3. This may be referred to as a stud style bolt that rests on the bottom closed end of the canister such that is shoulder portion or its head is trapped between the filter element and the canister, etc.

Looking at FIGS. 1 and 2, a pulsation dampening device 224 may include a first baffle 226 extending from the housing bolt 300, and a second baffle 228 extending either from the base 102 or the filter element 200 that is disposed proximate to the first baffle 226, defining a flow passage 230 with a minimum distance 232 between the first baffle 226 and the second baffle 228. In certain embodiments of the present disclosure, the minimum distance 232 ranges from 0.1 mm to 5.0 mm.

As a result of this construction, a pressure pulsation(s) 120 downstream from the annular filter media 202 may be greatly reduced before they reach the annular filter media 202. In turn, this might reduce any degradation of the performance of the filter element 200 such as its output to an engine or another downstream device. The minimum distance 232 may be varied to achieve the desired effect, and may be different than the range just mentioned in other embodiments of the present disclosure. As will be described momentarily, the configurations of the first baffle 226, and the second baffle 228 may be reversed in other embodiments of the present disclosure.

As shown in FIGS. 1 and 2, the first baffle 226 may extend radially outwardly and longitudinally upwardly from the housing bolt 300 past the top open end 220 (e.g. top end cap 208) of the filter element 200. The second baffle 228 may be attached to the base 102 and extends longitudinally downwardly and radially inwardly from the base 102 past the top open end 220 (e.g. top end cap 208) of the filter element 200.

The second baffle 228 may define a S-shaped portion 234. A third baffle 236 may extend purely longitudinally from the S-shaped portion 234 of the second baffle 228 to the top open end 220 (e.g. top end cap 208) or to the center tube 206, forming a downward facing V-shaped region 239 with the second baffle 228. The first baffle 226 may be disposed between the second baffle 228, and the third baffle 236, defining a serpentine shaped flow passage 230 (may have a consistent minimum distance 232 or not). Other configurations are possible in other embodiments. For example, the second baffle may have other configurations such as a straight shape, etc.

In some embodiments of present disclosure, such as shown in FIG. 1, the second baffle 228 is attached to the base 102, the first baffle 226 is attached to the housing bolt 300, and the third baffle 236 is attached to the filter element 200 (the third baffle 236 may be attached to the top open end 220 (e.g. the top end cap 208) or to the center tube 206, etc.). During assembly, the housing bolt 300 may be attached to canister 104 and the filter element 200, forming a subassembly. Then, the canister 104, the filter element 200, and the housing bolt 300 are attached to the base 102. The third baffle 236 then contacts the second baffle 228, forming a seal therebetween, and the second baffle 228 fits between the first baffle 226, and the second baffle 228 to form the serpentine flow passage 230.

In other embodiments, the second baffle 228 and the third baffle 236 may be unitary and may be attached to the filter element 200 so that these baffles contact the base 102. Other variations are possible.

The first baffle 226, the second baffle 228, and the third baffle 236 may all comprise a thermoplastic material (e.g. Polyurethane, nylon, etc.). Other materials such as metal may be used in other embodiments, and the materials of the various baffles may be different from each other, etc. The first baffle 226, the second baffle 228, and the third baffle 236 may all have the same thickness 238 (minimum dimension) ranging from 0.1 mm to 45.0 mm in certain embodiments. Other thicknesses and ranges may be used in other embodiments of the present disclosure.

The first baffle 226, the second baffle 228, and the third baffle 236 may be concentric about the longitudinal axis 216 (e.g. may be geometrically formed by rotating the cross-section shown in FIG. 1 about the longitudinal axis). Similarly, the filter element 200 may concentric with the canister 104, and with the housing bolt 300. Other configurations are possible in other embodiments of the present disclosure. The housing bolt 300 may be attached to the canister 104 or the base 102, fixing the position of the housing bolt 300 relative to the canister 104 and/or the base 102.

A filter element 200 that may be provided as a replacement part according to an embodiment of the present disclosure that may be used with the canister filter system 100 just described will now be discussed with reference to FIGS. 1 and 2. The filter element 200 may include a filter pulsation dampening device 224 that has a filter element baffle 236' extending longitudinally upwardly from the top open end 220 (e.g. top end cap 208) or from the center tube 206 of the filter element 200.

The filter element 200 may further comprising a housing bolt 300 with a bolt baffle 226' extending radially outwardly and longitudinally upwardly from the housing bolt 300 past the top open end 220 (e.g. top end cap 208) of the filter element 200, terminating at a bolt baffle free end 240 in close but spaced apart relation to the filter element baffle 236', defining a flow passage 230 having a minimum distance 232 between the filter element baffle 236' and the bolt baffle 226'. The minimum distance 232 may range from 0.1 mm to 5.0 mm. This distance may be varied as previously described.

In the embodiment shown in FIGS. 1 and 2, the filter element baffle 236' may be attached to the top open end 220 (e.g. top end cap 208) of the filter element 200, to the center tube 206, or both. The bolt baffle 226' may be joined to the housing bolt 300 at a point 242 disposed longitudinally below the top open end 220 (e.g. top end cap 208) of the filter element 200.

As alluded to earlier herein, the filter element baffle 236', and the bolt baffle 226' comprise a thermoplastic material, and have the same thickness ranging from 0.1 mm to 54.0 mm. Other variations are possible as previously described herein.

Similarly, the filter element baffle 236', and the bolt baffle 226' may be concentric about the longitudinal axis 216 (e.g. may be formed by rotating the cross-sectional geometry in FIG. 1 about the longitudinal axis 216).

The center tube 206 and the housing bolt 300 may be separate components or they may be formed as an unitary component.

Next, the housing bolt 300 will be described in further detail with continued reference to FIGS. 1 and 2.

The housing bolt may comprise an at least partially cylindrical body 300 defining a cylindrical axis 302 and a radial direction 304. The housing bolt 300 may have a head 306 defining a head diameter 308, and a shaft portion 310 extending axially from the head 306. The shaft portion 310 defining a shaft portion diameter 312 that is less than the head diameter 308, forming a support surface 314 configured to contact a portion of the filter element 200. A first baffle 226 (as previously discussed herein) may extend from the shaft portion 310. More specifically, the first baffle 226 may extend from the side of the shaft portion 310, axially away from the head 306, and radially away from the shaft portion 310.

The first baffle 226 may extend from the shaft portion 310 at an attachment point 242 that is spaced axially away from the head 306 an attachment point axial distance 316 ranging from 50% to 100% of the length of the filter. The first baffle 226 may define a first baffle thickness 238' ranging from 0.1 mm to 54.0 mm. Other configurations and dimensional ranges are possible in other embodiments of the present disclosure.

The first baffle 226 may terminate at a free end 240' that is also spaced axially away from the head 306 a free end axial distance 318 ranging from 50% to 120% of the length of the filter. The free end 240' may also being spaced radially away from the shaft portion 310 a free end radial distance 320 ranging from 10% to 98% of the inner diameter of the center tube. Again, other configurations and dimensional ranges are possible in other embodiments of the present disclosure.

Figure 4:
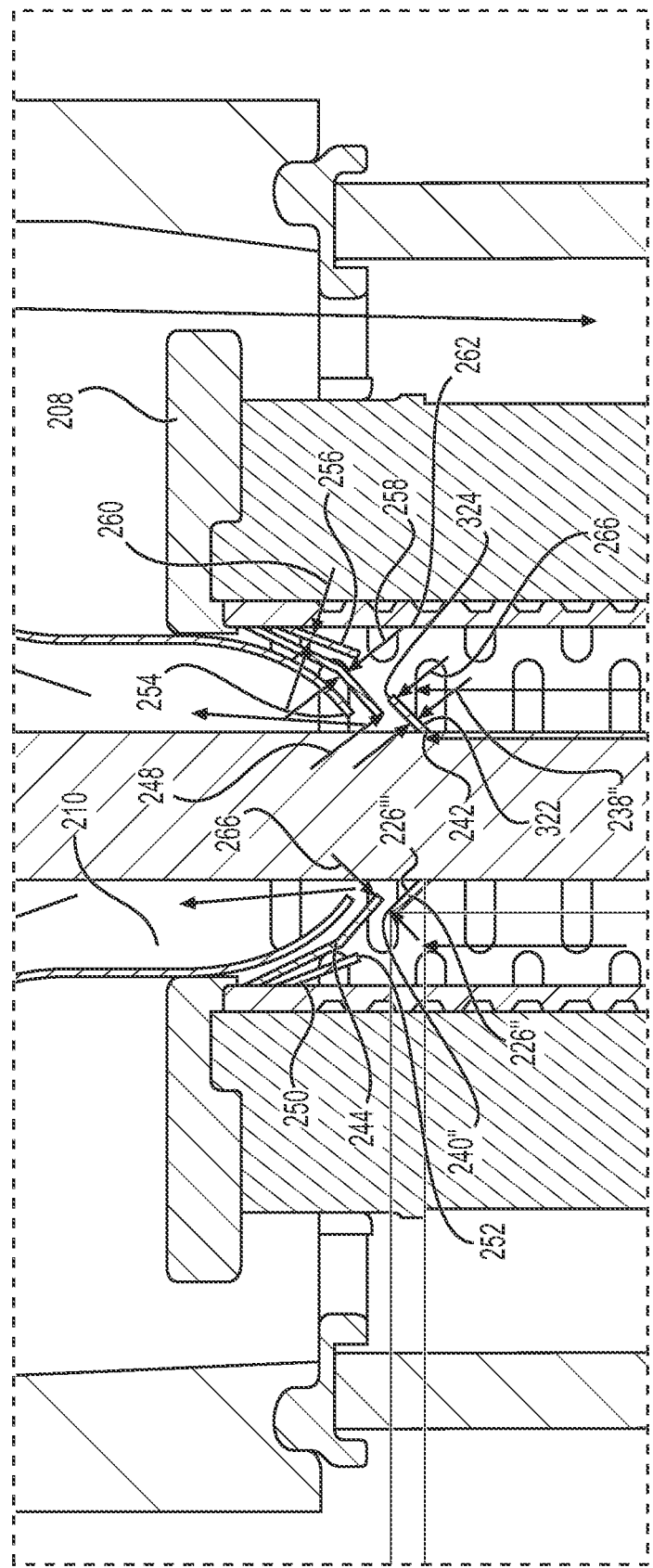
FIG. 4 is an enlarged detail view of the filtration pulsation dampening device of the filter assembly FIG. 3.

Referring now to FIGS. 3 and 4, canister filter system 100' (similar to canister filter system 100) that uses a filter pulsation dampening device 224' according to other embodiments of the present disclosure will now be discussed.

The filtration pulsation dampening device 224' may include a first baffle 226" extending from the housing bolt 300', and terminating at a first baffle free end 240", and a flexible valve 244 extending from the filter element 200' that defines a valve free end 246 that is disposed radially inwardly and longitudinally above the first baffle free end 240". This construction defines a shut-off gap distance 248 between the first baffle valve free end 240" and the flexible valve 244. The shut-off gap distance 248 may range from 0.1 mm to 5.0 mm.

As a result of this construction, a pressure pulsation(s) 120 downstream from the annular filter media 202 may be greatly reduced before they reach the annular filter media 202. In turn, this might reduce any degradation of the performance of the filter element 200' such as its output to an engine or another downstream device. The shut-off gap distance 248 may be varied to achieve the desired effect to be different than the range just mentioned in other embodiments of the present disclosure. The flexible valve 244 opens when there is no pressure pulsation downstream, allowing a normal flow of filtered fluid.

This arrangement of the flexible valve and the first baffle may be reversed in other embodiments of the present disclosure. In FIGS. 3 and 4, the flexible valve 244 (e.g. a diaphragm, a flap, etc.) extends radially inwardly and longitudinally downwardly from the center tube 206 or the top open end 220 (e.g. the top end cap 208) of the filter element 200". In certain embodiments, the flexible valve 244 extends from the center tube 206 and terminates in the central reservoir 204 of the filter element 200'.

The pulsation dampening device 224' may also have a support baffle 250 extending from either the top open end 220 (e.g. the top end cap 208) or the center tube 206 of the filter element 200' longitudinally below and parallel with the flexible valve 244.

The first baffle 226", and the support baffle 250 may comprise the same material (similar to what has been described earlier herein), and may have the same thickness 238". The support baffle 250 terminates at a support baffle free end 252 that is disposed radially outward and longitudinally above the valve free end 246. The support baffle 250 may help support the flexible valve 244 so that it does not tear, overly deform, or otherwise become ineffective as the flexible valve 244 opens and closes on the first baffle 226.

A second baffle 228' including a serpentine shape (e.g. a S-shaped curve, undulating curve, etc.) that extends longitudinally below the top open end 220 (e.g. the top end cap 208) of the filter element 200', terminating in a second baffle free end 254 that is disposed longitudinally above the valve free end 246. The second baffle 228' may extend all the way from the base 102 or it may be split into two pieces including a bottom piece extending from the top end cap and a top piece extending from the base to the filter element, creating a seal between these components, etc. The support baffle and the second baffle may also be integrated into an unitary baffle that extends from the filter element and contacts the base. Other configurations are possible in other embodiments of the present disclosure.

The second baffle 228' may limit the upward movement of the flexible valve 244 as it opens so that it does not tear, overly deform or otherwise become ineffective as the flexible valve 244 opens and closes.

Similar to what has been previously described herein, the first baffle 226", the second baffle 228', the support baffle 250, and the flexible valve 244 are concentric about the longitudinal axis 216. That is to say, these components may be created by rotating the cross-sectional geometry about the longitudinal axis 216. Likewise, the filter element 200' may be concentric with the canister 104, and with the housing bolt 300'. The housing bolt 300' may be attached to the canister 104 or the base 102, fixing the position of the housing bolt 300' relative to the canister 104 and/or the base 102. Other constructions are possible in other embodiments of the present disclosure.

Now, a filter element 200' that may be provided as a replacement part according to an embodiment of the present disclosure that may be used with the canister filter system 100' just described will now be discussed with reference to FIGS. 3 and 4. The filter element 200' includes a filter pulsation dampening device 224' having a flexible valve 244 that defines a valve free end 246 that is disposed in the central reservoir 204 of the center tube 206. The flexible valve 246 extends radially inwardly and longitudinally downwardly from the center tube 206 or the top open end 220 (e.g. the top end cap 208) of the filter element 200'. As shown in FIGS. 3 and 4, the flexible valve 246 actually extends from the center tube 206 in the embodiment shown.

The pulsation dampening device 224' may include a radially outer baffle 256 extending from the center tube 206 that is disposed longitudinally below the flexible valve 244. The radially outer baffle 256 extends longitudinally downwardly and radially inwardly from the center tube 206. The radially outer baffle 256 terminates at an outer baffle free end 258 that is spaced longitudinally above and radially outwardly away from the valve free end 246.

The radially outer baffle 256 may comprise a thermoplastic material or other suitable material as discussed earlier herein. The radially outer baffle 256 has an outer baffle thickness 260 ranging from 0.1 mm to 5.0 mm. The flexible valve 244 may comprise a rubber material or other suitable material. The flexible valve 244 has a valve thickness 262 ranging from 0.01 mm to 5.0 mm (may be made from an elastomer such as used in seals, and the range may be more particularly from 0.1 mm to 5.0 mm, etc.). These dimensional ranges may be different in other embodiments of the present disclosure.

The flexible valve 244 and the radially inner baffle 256 may be concentric about the longitudinal axis 216 as previously alluded to herein. This may not be the case for other embodiments.

The housing bolt 300' may have a radially inner baffle 322 extending longitudinally upwardly and radially outwardly from housing bolt 300', terminating at an inner baffle free end 324. The inner baffle free end 324 may be disposed radially outward and longitudinally below the valve free end 246, defining a gap 264 with a minimum gap distance 266 from ranging 0 mm to 10.0 mm. The range for this distance may be different in other embodiments of the present disclosure.

Next, the housing bolt 300' will be described in further detail with continued reference to FIGS. 3 and 4. The housing bolt 300' may be similarly constructed as discussed earlier herein with respect to FIG. 1. Furthermore, the housing bolt 300' may include a first baffle 226" extending from the shaft portion 310. The first baffle 226" may extend axially away from the head 306, and radially away from the shaft portion 310.

More specifically, the first baffle 226" may extend from the shaft portion 310 at an attachment point 242' that is spaced axially away from the head 306 an attachment point axial distance 316' ranging from 50% to 100% of the length of the filter, and the first baffle 226" defines a first baffle thickness 238' ranging from 0.1 mm to 5.0 mm. These dimensional ranges may be different in other embodiments of the present disclosure.

Also, the first baffle 226" may terminate at a free end 240''' that is spaced axially away from the head 306 a free end axial distance 318' ranging from 5.0 mm to 15.0 mm. The free end 240''' may also be spaced radially away from the shaft portion 310 a free end radial distance 320' ranging from 5.0 mm to 15.0 mm.

Any of the aforementioned dimensions and configurations may be different than what has been specifically set forth herein. Moreover, the materials of the various components discussed above may be different than those specifically mentioned.

INDUSTRIAL APPLICABILITY

In practice, a filter element, a housing bolt, or a canister filter system may be obtained or provided in an OEM (original equipment manufacturer) or aftermarket context according to various embodiments of the present disclosure.

The center tube and the housing bolt may be made from any suitable material including plastic, metal, etc. It may be desirable to choose materials that are chemically compatible with the fluids being filtered.

Various parameters may be measured to determine the efficacy of any of the embodiments discussed herein for a particular application. For example, at point A in FIGS. 1 and 3, the magnitude of the pressure pulsation 120 may be monitored, the pressure and the flow rate of the outgoing fluid may be monitored. Also, at point B in FIGS. 1 and 3, base line pressures of the pressure pulses may be monitored, and the pressure of the fluid may be measured. So, the pressure drop of the fluid may be determined as well as the flow rate as a function opposing pressure pulsations. The geometry of the pulsation dampening mechanism may be adjusted to achieve the desired outgoing fluid flow and/or the desired pulsation pressure exerted on the filter media, etc.

In addition to or in lieu off actual testing, these parameters may determine and the geometry of the pulsation dampening device tailored using FEA (finite element analysis). Only the central reservoir, the outlet and any areas in fluid communication between these areas (defined by the baffles) may need to be modeled.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A replaceable filter element that includes at least a partially cylindrical configuration and that defines a longitudinal axis, and a radial direction, the filter element comprising:
    an annular filter media defining a central passage;
    a center tube that is disposed in the central passage of the annular filter media that defines a central reservoir, and the annular filter media surrounds the center tube and the central reservoir;
    a top open end joined to the center tube disposed along the longitudinal axis, the top open end including an opening allowing fluid to flow from the central reservoir to the outside of the filter element;
    a bottom open end joined to the center tube opposite the top open end disposed along the longitudinal axis; and
    a filter pulsation dampening device including
        a filter element baffle extending longitudinally upwardly from the top open end or from the center tube of the filter element.

2. The replaceable filter element of claim 1 further comprising a housing bolt and a bolt baffle extending radially outwardly and longitudinally upwardly from the housing bolt past the top open end of the filter element, terminating at a bolt baffle free end in close but spaced apart relation to the filter element baffle, defining a flow passage having a minimum distance between the filter element baffle and the bolt baffle.

3. The replaceable filter element of claim 2 wherein the filter element baffle is attached to the top open end of the filter element.

4. The replaceable filter element of claim 3 wherein the bolt baffle is joined to the housing bolt at an attachment point disposed longitudinally below the top open end of the filter element.

5. The replaceable filter element of claim 2 wherein the minimum distance ranges from 0.1 mm to 5.0 mm.

6. The replaceable filter element of claim 4 wherein the filter element baffle and the bolt baffle comprise thermoplastic material, and have the same thickness ranging from 0.1 mm to 5.0 mm.

7. The replaceable filter element of claim 4 wherein the filter element baffle and the bolt baffle are concentric about the longitudinal axis.

8. The replaceable filter element of claim 2 wherein the center tube and the housing bolt are separate components.

9. A housing bolt for use with a filter element for providing a filter pulse dampening device, the housing bolt comprising:
    an at least partially cylindrical body defining a cylindrical axis and a radial direction, and including
        a head defining a head diameter;
        a shaft portion extending axially from the head, the shaft portion defining a shaft portion diameter that is less than the head diameter, forming a support surface configured to contact a portion of the filter element; and
        a first baffle extending from the shaft portion, the first baffle extending axially away from the head and radially away from the shaft portion.

10. The housing bolt of claim 9 wherein the first baffle extends from the shaft portion at an attachment point that is spaced axially away from the head an attachment point axial distance, and the first baffle defines a first baffle thickness ranging from 0.1 mm to 5.0 mm.

11. The housing bolt of claim 9 wherein the first baffle terminates at a free end that is also spaced axially away from the head a free end axial distance, the free end also being spaced radially away from the shaft portion a free end radial distance.

12. A pulse dampening interface between a filter and a filter base configured to mitigate pulses, the interface comprising:
    a filter element that includes at least partially a cylindrical configuration and that defines a longitudinal axis, and a radial direction, the filter element comprising:
        an annular filter media defining a central passage;
        a center tube that is disposed in the central passage of the annular filter media that defines a central reservoir, and the annular filter media surrounds the center tube and the central reservoir;
        a top open end joined to the center tube disposed along the longitudinal axis, the top open end including an opening allowing fluid to flow from the central reservoir to the outside of the filter element; and
        a bottom open end joined to the center tube opposite the top open end disposed along the longitudinal axis:
    a housing bolt;
    a base interfacing with the filter element; and
    a filter pulsation dampening device;
    wherein the filtration pulsation dampening device includes a first baffle extending from the housing bolt, and a second baffle extending either from the base or the filter element that is disposed proximate to the first baffle, defining a flow passage with a minimum distance between the first baffle and the second baffle.

13. The interface of claim 12 wherein the first baffle extends radially outwardly and longitudinally upwardly from the housing bolt past the top open end of the filter element, and the second baffle is attached to the base and extends longitudinally downwardly and radially inwardly from the base past the top open end of the filter element.

14. The interface of claim 13 wherein the second baffle defines a S-shaped portion.

15. The interface of claim 14 further comprising a third baffle extending longitudinally from the S-shaped portion of the second baffle to the top open end or to the center tube, forming a downward facing V-shaped region with the second baffle.

16. The interface of claim 15 wherein the first baffle is disposed between the second baffle and the third baffle, defining a serpentine flow passage, and the third baffle is attached to the top open end or to the center tube.

17. The interface of claim 12 wherein the minimum distance ranges from 0.1 mm to 5.0 mm.

18. The interface of claim 15 wherein the first baffle, the second baffle, and the third baffle comprise a thermoplastic material, and have the same thickness ranging from 0.1 mm to 5.0 mm.

19. The interface of claim 15 wherein the first baffle, the second baffle, and the third baffle are concentric about the longitudinal axis.

20. The interface of claim 12 wherein the filter element is concentric with the housing bolt.

\* \* \* \* \*